United States Patent [19]

Cook

[11] Patent Number: 4,884,346
[45] Date of Patent: Dec. 5, 1989

[54] APPARATUS FOR LINEAR MEASUREMENTS

[75] Inventor: Kenneth J. Cook, Troy, Mich.

[73] Assignee: GTE Valenite Corporation, Troy, Mich.

[21] Appl. No.: 292,056

[22] Filed: Dec. 30, 1988

[51] Int. Cl.$^4$ ................................................ G01B 7/12
[52] U.S. Cl. ......................................... 33/542; 33/783; 33/555.1
[58] Field of Search ............. 33/178 R, 178 E, 178 F, 33/787, 827, 783

[56] References Cited

U.S. PATENT DOCUMENTS

| | | | |
|---|---|---|---|
| 2,302,355 | 11/1942 | Sumner | 33/178 R |
| 2,451,600 | 10/1948 | Woodcock | 33/178 R |
| 2,454,246 | 11/1948 | Worthen | 33/178 R |
| 2,456,497 | 12/1948 | Forsmark | 33/178 R |
| 2,708,316 | 5/1955 | Fredd | 33/178 F |
| 2,767,974 | 10/1956 | Ballard et al. | 265/27 |
| 3,193,938 | 7/1965 | Aller | 33/172 |
| 3,422,540 | 1/1969 | Worthen | 33/143 |
| 3,439,761 | 4/1969 | Laimins | 177/211 |
| 3,576,128 | 4/1971 | Lockery | 73/141 |
| 3,800,895 | 4/1974 | Gale et al. | 177/136 |
| 3,864,054 | 2/1975 | Eysel | 408/147 |
| 3,938,603 | 2/1976 | Shoberg et al. | 177/211 |
| 3,958,338 | 5/1976 | Anichini et al. | 33/178 E |
| 3,958,455 | 5/1976 | Russell | 73/141 |
| 3,977,194 | 8/1976 | Klee et al. | 60/547 |
| 4,078,314 | 3/1978 | McMurtry | 33/174 |
| 4,170,831 | 10/1979 | Olasz | 33/178 R |
| 4,279,079 | 7/1981 | Gamberini et al. | 33/149 |
| 4,283,941 | 8/1981 | Kutsay | 73/862.66 |
| 4,290,204 | 9/1981 | Possati | 33/178 E |
| 4,364,280 | 12/1982 | Kutsay | 73/862.66 |
| 4,411,326 | 10/1983 | Siegel | 177/211 |
| 4,443,947 | 4/1984 | Possati et al. | 33/178 E |
| 4,447,960 | 5/1984 | Golinelli | 33/178 E |
| 4,553,332 | 11/1985 | Golinelli et al. | 33/561 |
| 4,559,717 | 12/1985 | Scire et al. | 33/568 |
| 4,571,839 | 2/1986 | Burton | 33/178 |
| 4,625,413 | 12/1986 | Possati et al. | 33/143 |
| 4,711,037 | 12/1987 | Saadat | 33/520 |
| 4,722,142 | 2/1988 | Schmidt | 33/169 |

OTHER PUBLICATIONS

"Want to Move Something the Width of a Hair", Wye Creek Designs, Frederick, Md. 21701, (date unknown).

Primary Examiner—Allan N. Shoap
Assistant Examiner—Christopher Fulton
Attorney, Agent, or Firm—Robert E. Walter

[57] ABSTRACT

A gauging apparatus for making at least one displacement measurement comprises an elongated flexure member having a pair of spaced apart and substantially parallel body sections. Each body section has an extending portion for contacting a workpiece to be gauged and movable from one position to another corresponding to a displacement measurement. Spaced apart and substantially parallel top and bottom sections join the parallel body sections forming a unitary flexure member having a central opening. The flexure member includes a plurality of webs formed by a sufficiently thin section of material so as to form a hinge. Each of the parallel body sections include a pair of spaced webs for permitting the top and bottom sections to move in parallel motion. The bottom section includes an additional pair of web for permitting movement of the respective extending portions toward and away from each other and a proportional movement of the bottom section in response to such movement of the respective extending portions. At least one strain gauge is operably associated with the bottom section for sensing movement thereof.

3 Claims, 1 Drawing Sheet

U.S. Patent
Dec. 5, 1989
4,884,346
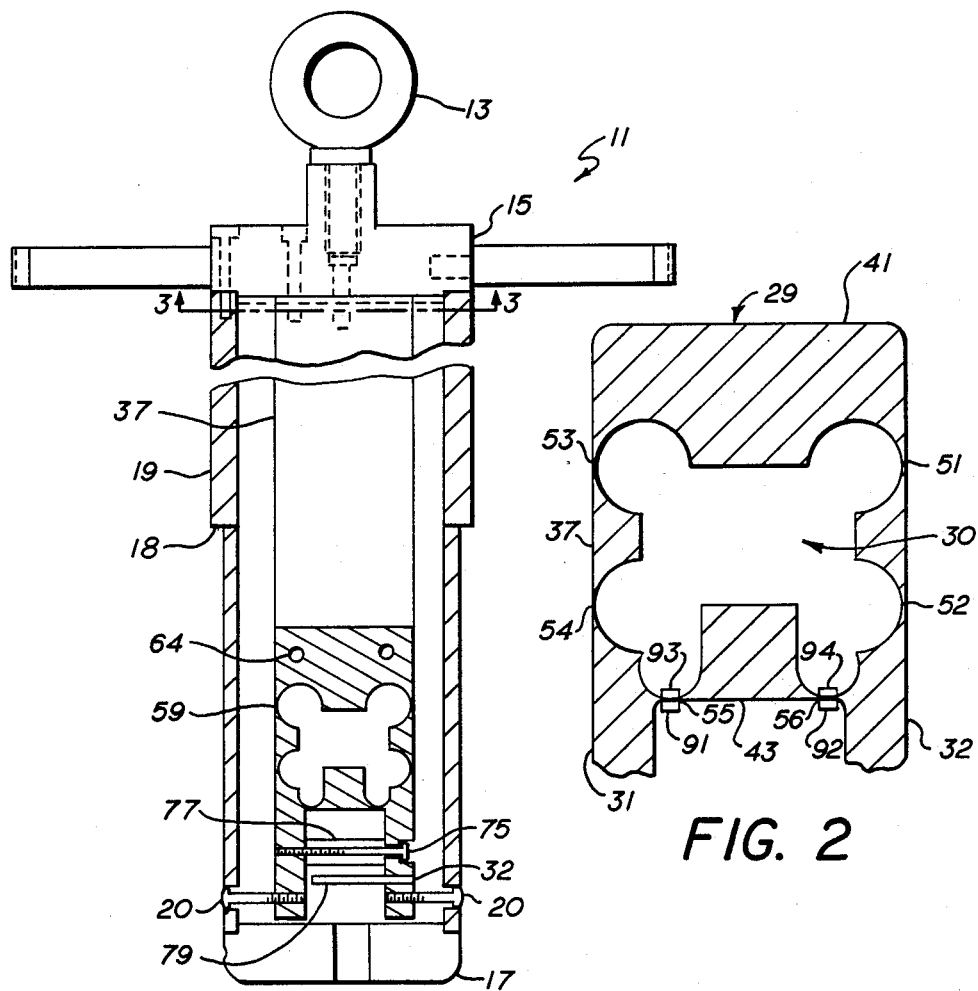
FIG. 1
FIG. 2
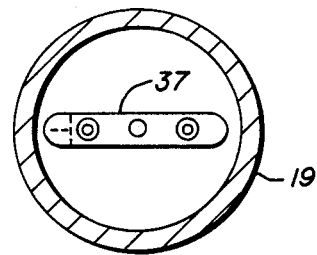
FIG. 3
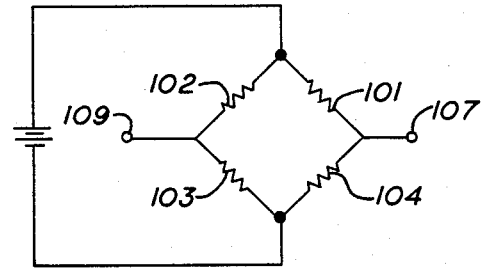
FIG. 4

APPARATUS FOR LINEAR MEASUREMENTS

FIELD OF INVENTION

The present invention relates to devices for making precise linear measurements.

BACKGROUND OF INVENTION

Gauge devices for making at least one linear measurement desirably minimize friction and contact between moveable parts. Friction causes wear which can result in error. U.S. Pat. No. 3,422,540 to Worthen describes a device utilizing a leaf sprin type reed in a gauge head which flexes without friction to adjust to work size.

Another desirable feature of a linear measurement device is to provide rectilinear motion. The above described U.S. Patent utilizes a single flexure point and therefore does not achieve true parallel motion. U.S. Pat. No. 3,193,933 describes a drive which uses parallel flexible arms mounted at one end and connected to a support member at the other end to provide rectilinear motion to the support member. This construction typifies a device using a rectangular flexure member with four separate flexures at the corners.

Conventional and current construction of parallel mechanical movements for linear measurement devices has concentrated on multipiece assemblies and one piece assemblies that use four separately machined flexures at the corners of a rectangular-shaped flexure member. The use of four separately machined flexure members introduce error since multiple pieces must be joined and errors attendant with the joining of multiple parts is introduced.

True linear motion in a gauging device is highly desirable for the measurement of very samll distances. Any inaccurate or nonparallel motion can result in measurement inaccuracies which must be corrected.

Flexure devices have been used in various force measurement devices. U.S. Pat. No. 4,559,717 to Scire et al disclose a flexure hinge capable of independent xy motion in a single plane free of pitch, roll, yaw, and of motion perpendicular to the plane of motion. U.S. Pat. No. 3,576,128 to Lockery et al discloses a parallelogram-type beam of the type having two transverse holes connected by a slot so as to provide upper and lower beams. Flexible portions are formed adjacent the top and bottom of the holes. The beams are relatively rigid longitudinal sections extend between the upper halves of each hole and between the lower halves of each hole. This construction results in substantially linear motion. The strains are measured at selected surface portions of the member to obtain a reading indicative of the force being applied. The device described in Lockery et al is force dependent. The greater the force applied, the greater is the force-induced strains. The device is built to resist the force whereby deflection is proportional to the force applied. Heretofore, devices of the type described are not believed to have been used in devices for making linear measurements.

SUMMARY OF THE INVENTION

It is, therefore, an object of this invention to obviate one or more disadvantages of the prior art.

It is another object of the present invention to make a device of simple construction but having a very high accuracy for making at least one linear measurement.

It is a further object to achieve parallel motion or motion in a plane without roll, yaw and motion perpendicular to the direction of motion.

In accordance with the present invention, there is provided a gauging apparatus for making at least one displacement measurement. An elongated flexure member comprises a pair of spaced apart and substantially parallel body sections. Each body section has an extending portion for contacting a workpiece to be gauged and movable from one position to another corresponding to a displacement measurement. Spaced apart and substantially parallel top and bottom sections join the parallel body sections forming a unitary flexure member having a central opening. The flexure member includes a plurality of webs formed by a sufficiently thin section of material so as to form a hinge. Each of the parallel body sections include a pair of spaced webs for permitting the top and bottom sections to move in parallel motion. The bottom section includes an additional pair of webs for permitting movement of the respective extending portions toward and away from each other and a proportional movement of the bottom section in response to such movement of the respective extending portions. At least one strain type guage is operably associated with the bottom section for sensing movement thereof.

BRIEF DESCRIPTION OF THE DRAWINGS

FIG. 1 is a side elevational view in section of a gauge employing the features of the present invention;

FIG. 3 is a cross section along 3—3 of FIG. 1.

FIG. 2 is a side elevational view of a flexure member of the present invention;

FIG. 4 shows a bridge circuit arrangement for producing an electrical signal related to the bending stress;

DETAILED DESCRIPTION

For better understanding of the present invention, together with other and further objects, advantages, and capabilities thereof, reference is made to the following disclosure and dependent claims taken in conjunction with the above-described drawings.

Referring now to the drawings with greater particularity, there is shown in FIG. 1, a plug-type gauge 11 for measuring the inside of a cylindrical bore. It is contemplated that other measurement devices utilizing the principles of the present invention are within the scope of the invention described.

Generally, the gauge 11 includes a handle 13 at the top which provides for ease of insertion of the gauge 11 into a cylindrical bore such as a bore on an automotive engine block. The handle 13 is connected to a top cover 15 which includes a cross member 16. A flange 18 limits the distance that the gauge 11 can be inserted into a bore to be measured. Intermediate the top cover 15 and bottom cover 17, an elongated cylindrical housing 19 is aligned along an longitudinal axis. Internal to the housing 19, a partition 37 connects the top cover 15 and bottom cover 17.

In operation, the gauge 11 is inserted into the cylinder bore with laterally projecting contact portions 20–21 extending exterior to the outer cylindrical surface of the housing 19 and being adapted to contact the inside surface of the bore to be measured. The contact portions 20–21 move in response to the surface to be dimensioned which is located exterior to the housing 19. A detector or indicating device (not shown), that can measure axial movement and translate the axial movement to a reading indicative of distances measured may be provided. Such device may be in the form of an electronic display, analog or digital, or other display as a dial or any other type of indicator.

Each of the contact members 20-21 form a part of or are rigidly but adjustably secured to extending portions 31,32 of the flexure member 29. The flexure member 29 comprises a pair of spaced apart and substantially parallel body sections 35,37. Each of the body section 35,37 has an extending portion 31 or 32 for contacting a workpiece to be gauged. During gauging, the extending portions 31,32 are movable from one position to another corresponding to the dimension being measurement. As shown in detail in FIG. 2, spaced apart and substantially parallel top section 41 and bottom section 43 join the parallel body sections 35 and 37 to form the unitary flexure member 29 having a central opening 30. The flexure member 29 includes a plurality of webs 51 to 56 formed by a sufficiently thin section of material so as to form a hinge. Each of the parallel body sections 35,37 include a pair of spaced webs, 51,52 and 53,54 respectively, for permitting the top and bottom sections 41,43 to move in parallel motion. The bottom section 43 includes an additional pair of webs 55,56 for permitting movement of the respective extending portions 31,32 toward and away from each other and a proportional movement of the bottom section 43 in response to such movement. Referring to FIG. 2, the flexure member 29 may be formed from a body of solid material having parallel surfaces extending lengthwise and separated by a thickness dimension. A pair of spaced apart circular openings may be drilled entirely through the body of the flexure member 29 in a widthwise dimension to form the respective webs 51-56. The holes may be joined by slots to form spaced apart parallel beams or body sections.

Each of the webs 51-56 form a hinge which permits movement of respective body section on either side of the respective web 51-56. The thinnest section of the web acts as the hinge about an axis extending in the direction perpendicular to the length of the respective body section. Typically, the web has a thickness, at its thinnest section, of about 0.1 to about 0.4 millimeters or 100 to about 400 microns. The webs 51-56 are sufficiently thin so as to permit movement of the flexure member with the application of very low forces. Due to the location of the webs 51-56, the extending portions 31,32 move toward and away from each other in a direction perpendicular to the parallel orientation of the respective body sections 35,37.

Fastener means such as bolts 64 may be conveniently utilized to fixedly secured flexure member 29 to partition 37. According to this arrangement of the flexure member 29, the relative linear movement between the contact portions 20,21 is precisely measured. A threaded screw 75 and spring 77 arrangement are utilized to to preload the extending portions 31,32 away from each other. The spring 77 urges the extending portions 31,32 apart while the head of the screw 75 limits the outer extension. A member 79 projects outwardly from one of the extending portions 31,32 toward the other extending portion to prevent overtravel of the extending portions 31,32 during gauging. The elongated member 79 is fixedly secured to one of the extending portions 31,32 and is spaced from the other of the extending portions 31,32.

As illustrated in in detail in FIGS. 2 and 4, means in the form of an associated electrical circuit of FIG. 4 and strain type gauges 91 to 94 as illustrated in FIG. 2. The highly concentrated strain areas at which the gauges 91-94 are located deform in response to the movable end 61 being displaced and generate an electrical signal corresponding to the deformation. Various strain gauges may be utilized with the present invention. One gauge available from Micro-Measurements Company of Romulus, Mich. is a foil gauge having a built in temperature compensator. Such a gauge is preparted by depositing a photosensitive and electrically conductive material in a wavy path on a Mylar substrate. As the substrate flexes in response to strains, the length and thickness of the deposited lines changes so as to change the resistance of the path and give a corresponding voltage. The temperature sensing feature is obtained by arranging more than one conductive path on a single gauge so as to cancel the effects of temperature on the voltage reading.

According to the arrangement of FIG. 2, the electrical signal generated is proportional to the distance that the bottom section 43 is displaced. FIG. 4 shows a representative circuit where the reference numbers 101 to 104 are strain gauges 91 to 94 set forth in FIG. 2. Although one arrangement of the strain gauges are shown, it is contemplated that other arrangements may be utilized. The strain gauges may be calibrated to measure displacement and conveniently connected to an indicator (not shown) to give an indication of the distance as measured. If the electrical signal produced by the electrical circuit interconnecting the strain gauges is not linear, it is contemplated that a microprocessor be utilized in the circuit to convert the electrical signal to a reading indicative of the distances moved.

From FIG. 1, it can be seen that the top section 41 of flexure member 29 remains immobile while the bottom section 43 moves in response to the measurement being taken. The measurement induced deflection causes the bottom section 43 to move and exhibit strains which are measured by the strain gauges. In particular gauges 91 to 94 will experience either tension or compression depending on the respective movement of the extending portions 31 and 32. If the extending portions 31 and 32 are displaced inwardly, the strain gauges 91 and 92 will be in compression and the strain gauges 93 and 94 will be in tension. If the extending portions 31 and 32 are displaced outwardly, the strain gauges 91 and 92 will be in tension and the strain gauges 93 and 94 will be in compression. The gauges can be wired in a conventional Wheatstone bridge arrangement as shown in FIG. 4 so that an output developed at terminals 107 and 109 is proportional to the distance gauged. Although it is not essential, it is preferred to connect the four strain gauge resistors into the bridge circuit so the tension and compression valves add. A dc source is connected across one pair of terminals as indicated, the other pair of terminals 107 and 109 serve as an output. It is also contemplated that the circuit compare the differences between the respective tension and compression values to give an indication of the distance as measured.

I claim:

1. Gauging apparatus for making at least one displacement measurement comprising a unitary flexure member, said flexure member comprises a pair of spaced apart and substantially parallel body sections, each body section includes an extending portion for contacting a workpiece to be gauged, spaced apart and substantially parallel top and bottom sections join said parallel body sections forming said unitary flexure member having a central opening, said unitary flexure member includes a plurality of webs formed by a sufficiently thin section of material so as to form a hinge, each of the parallel body sections include a pair of spaced webs for permitting said top and bottom sections to move in parallel motion, said bottom section includes an additional pair of webs for permitting movement of the respective extending portions toward and away from each other and a proportional movement of the bottom section in response to such movement of the respective extending portions, a strain guage operably associated with the bottom section for sensing movement for giving an electrical signal proportional to the displacement of said respective extending portions.

2. An apparatus for making at least one displacement measurement according to claim 1 wherein
each web is sufficiently thin whereby said movable end is adapted to be movable in response to very low forces.

3. An apparatus for making at least one displacement measurement according to claim 2 wherein
each web has a thickness of from about 100 to about 400 microns.

* * * * *